3,542,926
MUSCLE RELAXANT AND TRANQUILIZER COMPOSITION AND METHOD EMPLOYING 4,5-DIMETHYL - 5 - ETHYL - 4 - HYDROXY - 3 - HYDROXY-ETHYL-1,3-OXAZOLIDIN-2-ONE
Julius George Shukys, Chatham, N.J., assignor to Air Reduction Company, Incorporated, New York, N.Y., a corporation of New York
No Drawing. Filed Oct. 25, 1968, Ser. No. 770,824
Int. Cl. A61k 27/00
U.S. Cl. 424—272                               2 Claims

ABSTRACT OF THE DISCLOSURE

This invention relates to compositions containing 4,5-dimethyl - 5-ethyl-4-hydroxy-3-hydroxyethyl-1,3-oxazolidin-2-one and a pharmaceutically acceptable carrier for use in producing muscle relaxation and a state of tranquility in warm-blooded mammals and the method of preparing and using such compositions.

DESCRIPTION OF THE INVENTION

The present invention relates to compositions containing 4,5 - dimethyl-5-ethyl-4-hydroxy-3-hydroxyethyl-1,3-oxazolidin-2-one which are useful for producing muscle relaxation and a state of tranquility in warm-blood mammals. The effective compound in the composition of the present invention has the following structural formula:

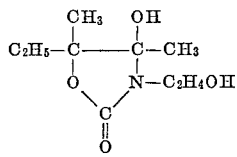

The compound 4,5-dimethyl-5-ethyl-3-hydroxy-3-hydroxyethyl-1,3-oxazolidin-2-one is a white crystalline solid, is soluble in water, and has an empirical formula $C_9H_{17}O_4N$. It has a molecular weight of 203 and a melting point of 91°–93° C.

The compound used in preparing the composition of the present invention can be prepared by reacting ethanolamine with 4-methylene-5-methyl-5-ethyl-dioxolan-2-one according to the following equation:

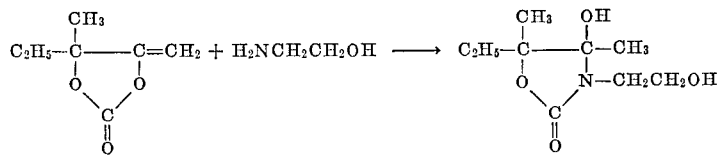

The starting material 4-methylene-5-methyl-5-ethyl dioxolan-2-one is a known material which is readily prepared by reacting a tertiary acetylenic alcohol whose hydroxy group is adjacent to the triple bond with carbon dioxide under pressure and in the presence of copper compounds and amines as described in U.S. Pat. No. 3,082,216. The other starting material, ethanolamine, is readily available material.

The following example will illustrate the preparation of the compound of interest to the present invention from the common starting materials.

EXAMPLE 1

Preparation of 4,5-dimethyl-5-ethyl-4-hydroxy-3-hydroxyethyl-1,3-oxazolidin-2-one To 4 - methylene - 5-methyl-5-ethyl-1,3-dioxolan-2-one (71 g., 0.5 mole) was added slowly to a solution of ethanolamine (30.6 g., 0.5 mole) and 190 ml. benzene. The reaction mixture was agitated and the temperature was maintained at 40° C. by means of a cold water bath. After the addition of the amino alcohol and when the temperature began to fall, the reaction mixture was heated to and maintained at 50° C. for about 4 hr. The solvent was then removed at reduced pressure (0.6 mm. absolute). The residue, weighing 100.7 g., had a melting point of 84°–90° C. After two crystallizations from benzene, the product melted at 91°–93° C.

*Analysis.*—Calcd for $C_9H_{17}O_4N$ (percent): C, 53.18; H, 8.43; N, 6.89. Found (percent): C, 53.52; H, 8.97; N, 6.82.

Before testing any of the compositions of the present invention for use in producing muscle relaxation and a state of tranquility in warm-blooded mammals the $LD_{50}$ of the effective compound was determined. The $LD_{50}$ corresponds to the amount of compound necessary to kill 50% of the mice tested in a given period of time. The $LD_{50}$ was determined through the intraperitoneal administration of the compound to 28 female CF 1-S mice. The $LD_{50}$ was found to be over 7500 mg./kg. indicating that the compound was extremely safe for use in testing.

In order to test the effectiveness of the composition of the present invention in producing muscle relaxation and a state of tranquility in warm-blooded animals, solutions of the compounds were prepared in a pharmaceutically acceptable carrier. Since the compound of interest is water-soluble, water serves as a convenient carrier. Any other pharmaceutically acceptable carrier, in which the compound is soluble would also be suitable, for example, an isotonic saline solution. The compositions can also be prepared as emulsions employing pharmaceutically acceptable carriers in which the compound is insoluble. The solution or emulsion can be administered to the mammal by injection. If desired the compound could also be used in solid form mixed with a suitable diluent in a pill or tablet. Calcium carbonate and lactose or milk sugar are suitable diluents for making up the solid form for administration.

In order to test the compound for its muscle relaxing and tranquilizing effect on warm-blooded mammals, several different aqueous solutions of the compound were prepared and administered intraperitoneally to the mice to be tested. The results of the tests and the different compositions employed are shown in the following table.

| Dose | 750 mg./kg. | 750 mg./kg. | 1,500 mg./kg. | 1,500 mg./kg. | 1,500 mg./kg. | 6,000 mg./kg. | 6,000 mg./kg. |
| --- | --- | --- | --- | --- | --- | --- | --- |
| Test interval, min | 10–60 | 10–60 | 10–60 | 10–60 | 10–60 | 10–60 | 10–60. |
| Righting reflex | Present | Present | Present | Present | Present | Present | Present. |
| Alertness | Normal | Normal | Normal | Normal | Normal | Slight decrease | Slight decrease. |
| Activity | do | do | do | Slight decrease | Slight decrease | do | Decreases. |
| Restlessness | Slight | Slight | Absent | Absent | Absent | Absent | Absent. |
| Sensitivity to handling | Slight increase | Increase | Normal | Decreased | Decreased | Decreased | Completely insensitive. |
| Passivity | Not passive | Not passive | Slightly passive | Slightly passive | Slightly passive | Slightly passive | Completely passive. |
| Fearfulness | Present | Present | Absent | Absent | Absent | Absent | Absent. |
| Muscle tone | Normal | Slightly flaccid | Slightly flaccid | Flaccid | Flaccid | Very flaccid | Flaccid. |
| Palpebral opening | do | Normal | Droopy | Droopy | Droopy | Droopy | Droopy. |
| Respiratory rate | do | do | Slow | Slow | Slow | Slow | Slow. |
| Startle response | Present | Present | Absent | Absent | Absent | Absent | Absent. |
| Body position | Normal | Normal | Flat | Flat | Flat | Flat | Flat. |
| Limb position | do | do | Close to body | Close to body | Close to body | Close to body | Close to body. |

It can be clearly seen from the test results that the compound produces a tranquilizing effect in warm-blooded mammals as well as a strong muscle relaxing effect. Despite the soft muscle tone of some of the test mice, those at lower doses were able to coordinate, and could hold on repeatedly if tested. Also, where the mice were in an excited state before administration of the test compositions after administration they were totally indifferent to disturbance and in fact seemed to enjoy being handled. In over all effect the compound appeared to produce a "don't-care" reaction in the test mice.

The effective amount of 4,5-dimethyl-5-ethyl-4-hydroxy-3-hydroxyethyl-1,3-oxazolidin-2-one to be administered to a warm-blooded animal to produce muscle relaxation and a state of tranquility is dose-dependent. Since the compositions are essentially nontoxic, large amounts of the compounds can be safely administered. Doses of the compound ranging from a few hundred mg./kg. to several thousand mg./kg. can be used with more of the dilute composition being added if necessary to increase the amount of muscle relaxation and tranquilization. The manner of administering the compositions is not critical, and since water is an excellent solvent for the compound, aqueous solutions can be easily and accurately prepared for use and this is the preferred mode for administering the compositions.

I claim:

1. A composition for producing muscle relaxation and a state of tranquility in a warm-blooded mammal comprising a pharmaceutically acceptable carrier and an effective amount of the compound 4,5-dimethyl-5-ethyl-4-hydroxy-3-hydroxyethyl-1,3-oxazolidin-2-one.

2. A method for producing muscle relaxation and a state of tranquility in a warm-blooded mammal comprising administering to said warm-blooded mammal an effective amount of 4,5-dimethyl-5-ethyl-4-hydroxy-3-hydroxyethyl-1,3-oxazolidin-2-one.

References Cited

UNITED STATES PATENTS 2,575,694   11/1951   Spielman _____ 424—272

STANLEY J. FRIEDMAN, Primary Examiner

U.S. Cl. X.R.

260—307.3

UNITED STATES PATENT OFFICE
CERTIFICATE OF CORRECTION

Patent No. 3,542,926              Dated November 24, 1970

Inventor(s) Julius George Shukys

It is certified that error appears in the above-identified patent and that said Letters Patent are hereby corrected as shown below:

Column 1, line 37, "-3-hydroxy" should read -- -4-hydroxy--.

Signed and sealed this 18th day of May 1971.

(SEAL)
Attest:

EDWARD M. FLETCHER, JR.          WILLIAM E. SCHUYLER, JR.
Attesting Officer                  Commissioner of Patents